Nov. 26, 1940.  G. THORNTON-NORRIS  2,223,154
ELECTRIC IMMERSION HEATERS FOR HOT WATER BOTTLES
Filed May 17, 1938
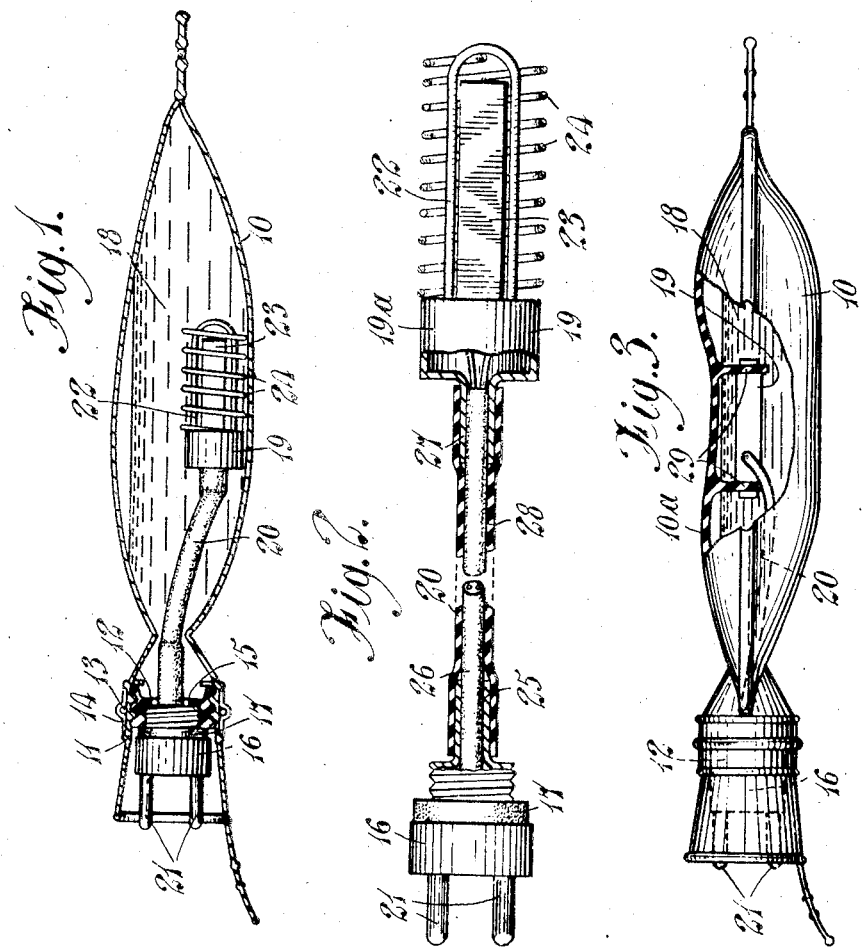
INVENTOR.
George Thornton Norris
BY
ATTORNEY.

Patented Nov. 26, 1940

2,223,154

UNITED STATES PATENT OFFICE 2,223,154

ELECTRIC IMMERSION HEATER FOR HOT WATER BOTTLES

George Thornton-Norris, London, England, assignor to Quadrant Electric Company Limited, London, England Application May 17, 1938, Serial No. 208,354
In Great Britain July 20, 1937

6 Claims. (Cl. 219—41)

This invention relates to electric immersion heaters for hot-water bottles and like closed containers.

The object of the invention is to provide an improved method of mounting such immersion heaters and also an improved construction and arrangement which is not only safe and efficient in operation, but is also inexpensive to manufacture.

It will be appreciated that in heating the contents of hot-water bottles and like closed containers, it is usually necessary in the interests of safety to provide means whereby the electric current is switched off automatically should the bottle be inverted or placed in such a position that the liquid contained therein runs away from the heating element, but according to the present invention, this difficulty is overcome by mounting the heating element so that it is freely movable in relation to the container and thus tends to fall by gravity to the lowest part of said container, where, of course, the liquid will also be disposed. This effect may most readily be obtained by mounting the heating element within the container and upon a length of flexible material serving as or carrying the electrical conductors.

Thus, the invention provides an electrically heated hot-water bottle or like totally enclosed vessel having a heating element which is free to sink of its own accord in the liquid, and which is fed with electricity through a flexible conducting cable extending from the interior of the vessel to said heating element.

As a further feature the invention provides an electrical immersion heater device for a hot-water bottle or like totally enclosed vessel, said device comprising a heating element which is of such a weight that it sinks in the liquid being heated, and which is tethered by a flexible electrical conducting cable carrying a stopper device arranged to pass the electrical conductor through the wall of the vessel in a liquid-tight manner. Preferably the heating element is formed in a unit with a thermostatically controlled switch adapted to cut off the electric current automatically when the temperature of the surrounding liquid reaches a predetermined value. Further, the electrical conducting cable may advantageously be protected from the liquid by an outer flexible tube which is secured in a liquid-tight manner to both the heating element and the stopper device, this conveniently being effected by a soft rubber tube which closely encases the cable and which is stretched at both ends over rigid tubes carried by the stopper device and the heating element respectively.

The invention is illustrated in the accompanying drawing in which

Figure 1 is a sectional elevation taken through a rubber hot-water bottle to show the arrangement of the improved heating device;

Figure 2 is a fragmentary sectional elevation of the heating element and stopper device; and Figure 3 shows a modified arrangement, the hot-water bottle being partly broken away to reveal the heating element.

In the arrangement shown in Figure 1 a rubber hot-water bottle 10 of the usual rectangular or any other convenient shape is provided with a mouth portion 11 which is occupied by a plug member 12 having a corrugated external surface. This is to ensure a satisfactory leak-tight joint between the plug member 12 and the mouth portion 11, these parts being securely held together by a binding ring 13 of wire which is protected by a rubber sleeve 14.

The plug member 12 is formed with a screw-threaded opening 15 for the reception of a stopper device 16 having a soft rubber washer 17 to prevent the leakage of water or other liquid 18 contained within the bottle 10.

In order to enable this water to be heated repeatedly by electricity an immersion heater device, indicated generally at 19, is arranged loosely within the interior of the hot-water bottle 10 and is tethered to the stopper device 16 by a flexible cable, indicated generally at 20, this, of course, being arranged to convey the electricity to and from the immersion heater device 19. For convenience in use the hot-water bottle is preferably removable as a unit from the normal flexible supply cable (not shown) by providing a pair of contact pins 21 upon the stopper device 16. Thus, the latter constitutes one element of a readily separable double-pole connector fitting.

The details of the heater device 19 and the flexible connection by which it is tethered are shown more clearly in Figure 2, and it will be seen that an electrical resistance element 22 for producing the heat is flattened in cross-section and is substantially U-shaped, its two limbs being secured to a casing 19a. This casing has a narrow extension 23 which is disposed between the limbs of the heating element 22, and which accommodates the heat-sensitive member of a thermostatically controlled switch (not shown) in the known manner for the purpose of switching off the supply to the heating element 22 when the temperature of the surrounding liquid reaches a predetermined value. A surrounding cage conveniently in the form of a wire spiral 24 surrounds the resistance element 22 with a view to preventing it from coming into direct contact with the interior of the hot-water bottle 10. This protecting cage does not, of course, appreciably interfere with the circulating of liquid around the heating element 22.

A convenient construction for the flexible cable 20 is shown in Figure 2, and it will be seen that the stopper device 16 is formed with a rigid tubular extension 25 through which a two-core rubber-covered flexible conductor 26 is threaded, the end of said conductor being arranged to pass into a similar tubular extension 27 formed upon the casing 19a. Leakage of liquid at both ends is prevented by an outer soft rubber tube 28 which passes over the cable 26 and which grips the extensions 25 and 27 firmly at its two ends. This provides a relatively flexible anchorage for the heating element 19 and as the latter is made heavier than the liquid which is to be heated, said element normally falls of its own accord towards the lowest part of the hot-water bottle 10 whatever position this may occupy. Under normal circumstances, therefore, the heating element is submerged in liquid and there is practically no danger of overheating or burning the rubber of the hot-water bottle 10.

In the modification shown in Figure 3 the heater device 19 is again supplied through a flexible cable 20, but its movements are partly restricted owing to the fact that it is secured to the upper wall 10a of the hot water bottle 10 conveniently by means of lugs 29. Owing to the weight of the heater device, the latter normally tends to become submerged in the liquid within the bottle 10 and thus bring about a satisfactory heating effect.

In a modified arrangement (not shown) the heating element, together with a safety device such as a thermostatic switch and/or fuse of low melting point, is disposed within a shell the interior of which is accessible to the liquid through one or more comparatively restricted holes, the arrangement being such that if the heater, together with its surrounding shell, becomes raised out of the liquid a rapid local heating will take place, thus causing the circuit to be broken.

Although the arrangement in which the flexible conductor passes through the stopper of the usual filling aperture provides an exceptionally simple construction, it will be appreciated that a special entry may be provided for the flexible conductors and this in some cases may be moulded into the rubber or like material from which the bottle is formed. Moreover, the conductors may be disposed within the thickness of the bottle, the heater being attached conveniently to the middle part of one side. With this form the heater is submerged even when the bottle is laid horizontally with the heater uppermost as the upper wall naturally lies on the surface of the water.

In the foregoing specification, it will be understood that the term "hot-water bottle" refers to any container for liquid which is completely closed, and includes various receptacles for heating liquid which are used mainly by the medical profession, such for instance as those in the form of pads for the application of heat to various parts of the human body, and mattresses or the like such as are used in conjunction with X-ray operating tables and inspection couches.

The casings of the heaters and/or the thermostats may be partially evacuated and sealed, or may be provided with a breather passage extending through the flexible cable to the exterior of the bottle so as to prevent condensation.

What I claim is:

1. An electrically heated hot water bottle comprising a flexible bottle, a stopper for said bottle, a first rigid tube extending therefrom into said bottle, a flexible conductor of low electrical resistance passing from within said tube into the interior of said bottle, a heating unit attached to the free end of said conductor, a second rigid tube formed on said unit and surrounding said conductor, and a flexible rubber tube surrounding said conductor and having its ends engaged over both of said rigid tubes upon the stopper and said heating unit, respectively.

2. An electrically heated hot water bottle comprising a flexible bottle, a stopper for said bottle, a flexible conductor of low electrical resistance anchored at one end to said stopper, a heating unit attached to the other end of said conductor so as to freely sink by gravity towards the lowest part of said bottle to become totally submerged in the water, said heating unit comprising a U-shaped casing, a resistance element disposed therein, and a shield member, said member being constituted by a helix of wire loosely surrounding said casing of said resistance element to prevent the latter from resting directly in contact with the interior surface of the bottle.

3. An electrically heated hot water bottle comprising a flexible bottle, a stopper for said bottle, a flexible conductor of low electrical resistance anchored at one end to said stopper, a heating unit attached to the other end of said conductor so as to freely sing by gravity towards the lowest part of said bottle to become totally submerged in the water, said heating unit comprising a U-shaped casing, a resistance element disposed therein, a thermostatic switch connected in series with the resistance and disposed between the two legs of said U-shaped casing, and a helix of wire loosely surrounding the casing of the resistance element and forming a shield member to prevent said element from resting directly in contact with the interior surface of said bottle.

4. An electrically heated hot water bottle comprising a flexible bottle, a stopper for said bottle, a first rigid tube extending therefrom into said bottle, a flexible conductor of low electrical resistance passing from the bore of said tube into the interior of the bottle, a heating unit attached to the free end of said conductor, a second rigid tube formed on said unit and surrounding said conductor, and a flexible rubber tube surrounding said conductor and having its ends engaged over both of said rigid tubes upon said stopper and said heating unit, respectively, said heating unit comprising a casing having two legs, a resistance element disposed within said casing, a thermostatic switch connected in series with the resistance and disposed between said two legs of said casing containing the resistance element, and a helix of wire loosely surrounding the casing of the resistance element to form a shield member in order to prevent said element from resting directly in contact with the interior surface of said bottle.

5. An electrically heated hot water bottle comprising a flat flexible rubber bottle having a neck at one end, a stopper closing said neck, a flexible electric conductor of low resistance extending from the stopper into the bottle, a heater unit arranged to sink in water contained in said bottle and attached to the end of said conductor within said bottle, said heating unit comprising an electrical resistance element and a thermostatic switch connected in series with a source of electrical power fed through said conductor, and an openwork guard surrounding said resistance element and said thermostatic switch to prevent contact of said resistance element and switch with the rubber wall of the bottle.

6. An electrically heated hot water bottle comprising a substantially flat flexible bottle having converging end portions, a neck formed at one end of said bottle, a stopper to close said neck, an electric immersion heater disposed within the bottle and arranged to sink in water contained in said bottle, a flexible electric supply conductor extending from said stopper to said heater, said heater being of relatively smaller dimension than that of said bottle, and said conductor being of a length equal to substantially half the distance between the neck and the opposite end of said bottle to enable said heater to be positioned intermediate said converging end portions.

GEORGE THORNTON-NORRIS.